(No Model.)

H. WHEELER.
ADJUSTABLE INDEX FOR SPIRIT LEVELS.

No. 516,142.   Patented Mar. 6, 1894.

Witnesses:
H. W. Carmean
James Brooks

Inventor
Holland Wheeler

THE NATIONAL LITHOGRAPHING COMPANY,
WASHINGTON, D. C.

UNITED STATES PATENT OFFICE.

HOLLAND WHEELER, OF LAWRENCE, KANSAS.

ADJUSTABLE INDEX FOR SPIRIT-LEVELS.

SPECIFICATION forming part of Letters Patent No. 516,142, dated March 6, 1894.

Application filed February 20, 1893. Serial No. 463,131. (No model.)

*To all whom it may concern:*

Be it known that I, HOLLAND WHEELER, a citizen of the United States, residing at Lawrence, in the county of Douglas and State of Kansas, have invented a new and useful Adjustable Index for Spirit-Levels, of which the following is a specification.

My invention relates to improvements in the scales or indices attached to levels or leveling instruments (commonly called spirit levels) to indicate the correct position of the air bubble when the instrument is adjusted to determine a true level.

The object of my invention is to produce an adjustable index which may be quickly and accurately set to define the ends of the air bubble with any variation of its length due to change of temperature, and by means of which the correctness of the setting of the instrument may be verified at a glance, by an inspection of one end of the bubble only, and an index so conspicuously marked as not to be misobserved by the operator. I attain these objects by the mechanism illustrated in the accompanying drawings, in which—

Figure 1:
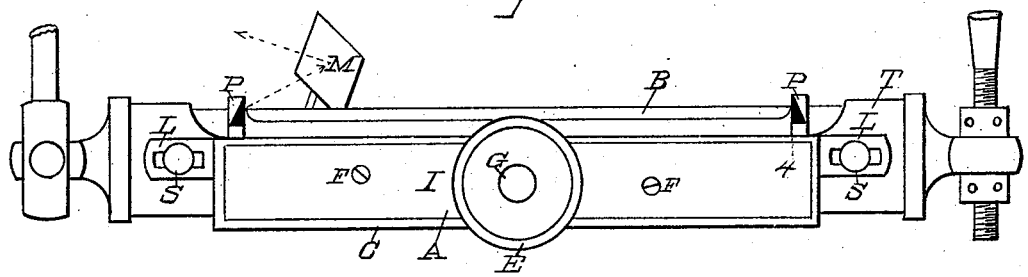
Figure 2:
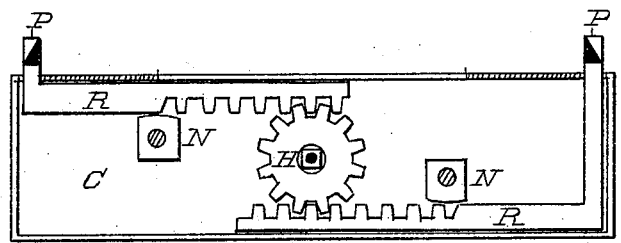
Figure 3:
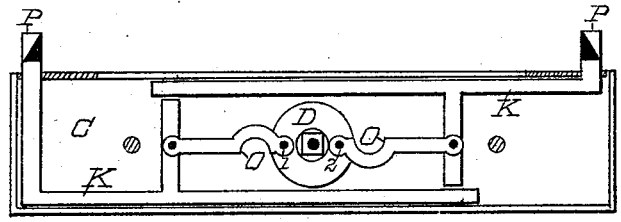
Figures 4, 6:
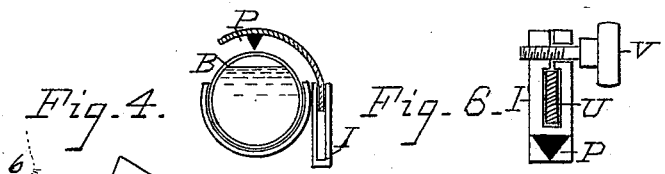
Figure 5:
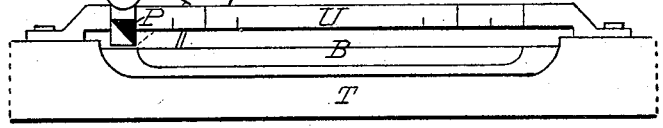

Figure 1, is a view of my invention as applied to the level tube of an engineer's "Y" level. Fig. 2, shows the interior construction of the device of the preferred form. Fig. 3, shows another modification of the interior construction. Fig. 4, is a cross-section on the line 4 of Fig. 1. Fig. 5 shows a simplified modification of the index, as applied to the graduated scale in common use on "Y" levels. Fig. 6, is a cross-section of the index P on the line 6 of Fig. 5. Figs. 2, 3 and 6 have the details somewhat enlarged, to show the parts.

Similar letters refer to similar parts throughout the several views.

Referring to Fig. 1, T is the tube with its attachments, containing the level vial with the bubble B.

I is the adjustable index shown in elevation, fastened to the part T by the lugs L L, with the capstan screws S S; I is constructed with a case C, having a cover A.

E is a thumb wheel, by which the pointers P P are manipulated.

F F are screws which secure the cover A.

G is a screw which retains the wheel E in place.

Referring to Fig. 2, which shows the interior of the case, the pointers P P are connected to the racks R R, which are operated by the wheel E (Fig. 1) by means of the pinion H; the racks R R are held in place by the guide blocks N N.

Referring to Fig. 3, which is also an interior view of the case C, the pointers P P are formed on the bars K K, and by the pivoted connection, bars O O are operated by the wheel E (Fig. 1), by means of the crank pins 1, 2 on the disk D.

Referring to Fig. 4, the pointer P has a sharp point projecting downward nearly in contact with the vial and in such a position that it may be reflected by the mirror M, in Fig. 1.

Referring to Fig. 5, I is an index having a single pointer P, which rides on the scale U and may be fastened thereto by the thumb screw V', which clamps the scale U between the two pieces into which the upper portion of index I is divided, as shown in Fig. 6.

The operation of the device is as follows: The index having been attached to the tube, by turning the thumb wheel E, the pointers P P are moved exactly equal distances and in opposite directions, the bubble being adjusted to the correct position to define a true level, the index is first brought into adjustment by loosening the screws S S, then the index is permitted to move to the right or left as required, by reason of the slots in the lugs L L. The pointers having been brought to include between them the exact length of the bubble, the index is then placed so that the pointers exactly coincide with the ends of the bubble, care being taken to keep the bubble in correct position, then the index is securely fastened by the screws S S. This adjustment being made, the index will define between the pointers the correct position of the bubble for a true level, corresponding to any length it may have by reason of change of temperature, by turning the wheel E. Otherwise it will be observed this adjustment may be made by first fastening the index and then bringing the bubble into adjustment with it, as is usual with a fixed scale or index. In using the single pointer, Fig. 5, the bubble is first adjusted to the proper position by reference to the divisions of the scale, then the index is set and clamped to correspond to one end of the bubble, and thereby recording its true position for the time being.

The utility of my invention is founded on the facts well known, that the temperature will not ordinarily change the length of the bubble during the time of an operation, and of the liability of the instrument to be disturbed between the time of observing the bubble and reading the rod or setting the target; hence the importance of a quick transfer of the sight from one to the other. With my device, an inspection of only one end of the bubble is required. If that is correct, the other is assured. By means of the small mirror M, this inspection may be made from the eye end of the telescope as usually made.

I do not contemplate a rigid adherence to details in all respects, in the construction of my invention, but to the principles of operation; as, for instance, the index could be placed above the level tube, its manner of attachment varied, its adjustment to the bubble could be made by a screw movement, or the shape of the pointers changed.

I am aware of the use of a mirror to reflect the images of both ends of the bubble and scale, and do not claim such a combination, but What I do claim as my invention, and desire to secure by Letters Patent, is—

1. An adjustable index to define the correct position of the bubble B. of a spirit level when it indicates a true level, said index having the pointers P. P., which are moved simultaneously equal distances in opposite directions by the rotation of the thumb wheel E., the case C. of said index being adjustable to the tube T. by means of the slotted lugs L. L. and screws S. S., all substantially as set forth.

2. The combination of the adjustable index and the mirror M. to reflect one end of the bubble B. and one of pointers P., in a direction to be conveniently observed, all substantially as set forth.

HOLLAND WHEELER.

Witnesses:
A. W. CARMEAN,
JAMES BROOKS.